May 23, 1967    N. DELCHEV    3,321,210
ELECTRICALLY CONTROLLED SHOCK ABSORBER SYSTEM
Filed April 12, 1966
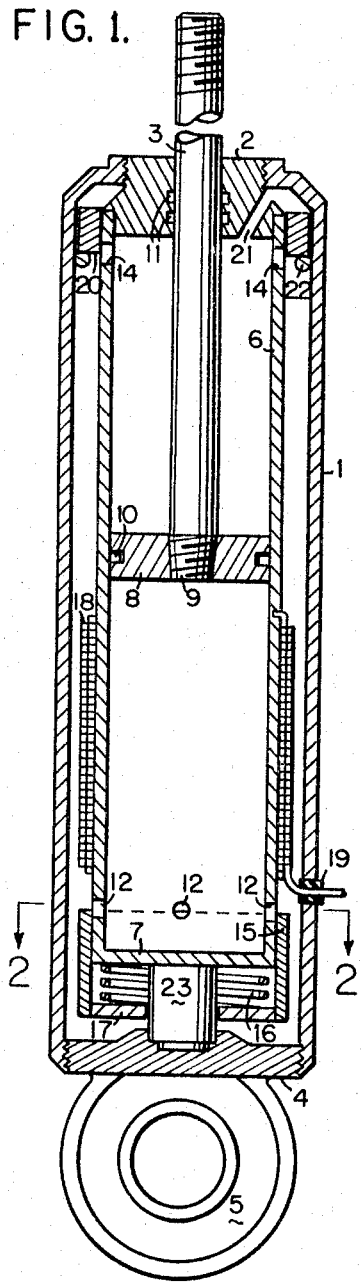
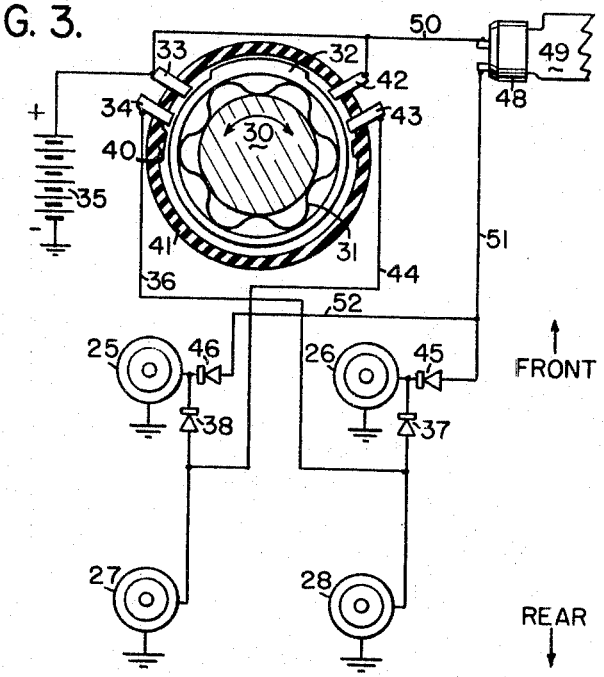
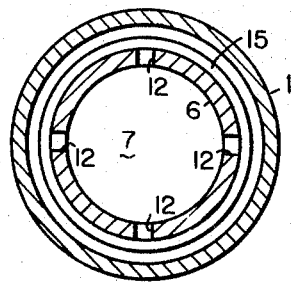
INVENTOR.
NEDELKO DELCHEV
BY Harry R. Lubcke
AGENT United States Patent Office 3,321,210
Patented May 23, 1967

3,321,210
ELECTRICALLY CONTROLLED SHOCK
ABSORBER SYSTEM
Nedelko Delchev, Glendale, Calif., assignor to Frederick
J. Harding, Northridge, Calif.
Filed Apr. 12, 1966, Ser. No. 542,076
10 Claims. (Cl. 280—6)

This invention pertains to a system of shock absorbers for a vehicle and more specifically to such a system where the resilience of individual shock absorbers is automatically controlled according to the control of the vehicle exercised by the driver. This is accomplished electrically.

The tendency of the usual vehicle, such as an automobile, to change attitude upon the brakes being suddenly applied or upon sharp turns being negotiated is known. Upon rapid deceleration the vehicle tends to "dive" or "nose down," whereas upon turns the vehicle tends to "sway" downward on the side opposite that of the direction of the turn; i.e., for a right turn the left side of the vehicle is depressed.

By means of automatically operative connections between the driver-operated controls and selected shock absorbers coactively associated with the several wheels it is possible to minimize the changes in attitude of the vehicle. Such selective electrical control effects significant changes in the resistance of the shock absorber to compressive stresses, thereby to strongly resist a compressive displacement. At other times when the vehicle is in use the functioning of the shock absorbers in providing a smooth ride is not altered.

The control according to this invention is accomplished by electrical alteration of a mechanical property of the shock absorber, as by electromagnetic attraction of a paramagnetic element acting to largely close one or more passages through which working fluid must flow upon the actuation of a driver-operated control for the usual operation of the vehicle; i.e., by the use of the brake pedal or the steering wheel. In a preferred embodiment a hydraulic shock absorber is provided with one or more apertures in the periphery of an inner cylinder constructed of paramagnetic material, with a spring-restrained sleeve or cup of paramagnetic material adapted to be magnetically attracted upon electric current being passed through a solenoid coil disposed around the inner cylinder. The parts are related so as to essentially shut off the flow of hydraulic fluid between an inner and an outer cylinder, thus to substantially immobilize a piston rod which carries the weight of the vehicle at the particular wheel involved.

By thus affecting the forward shock absorbers upon the brake pedal being operated by the driver, the tendency to "nose down" is essentially eliminated; and by providing alternate switching means coactive with the steering wheel the left or the right pair of shock absorbers can be substantially immobilized, to prevent "sway" while rounding turns.

An object of this invention is to provide a control system to maintain the attitude of a vehicle despite required driving maneuvers.

Another object is to accomplish attitude control automatically.

Another object is to provide a novel shock absorber for electrical control of its resilient properties.

Othere objects will be apparent upon examining the following specifications and drawings, in which are set forth by way of example certain embodiments of the invention.

FIG. 1 is a sectional elevation of one shock absorber,
FIG. 2 is a section of a whole shock absorber taken in the direction 2—2 in FIG. 1, and
FIG. 3 is an electrical diagram of the shock absorber system.

In FIG. 1 numeral 1 indicates the outer cylinder of one shock absorber. This is fitted with a top plug 2, having a central axial hole through which rod 3 passes. This rod attaches to one of the two entities between which shocks are to be absorbed, for example, the chassis of a vehicle. A bottom plug 4 closes the bottom of cylinder 1 and has integral with the plug an apertured boss 5, which attaches to the other entity, the wheel structure (axle). Each of the plugs are shown threaded into cylinder 1 for easy assembly, although one or both may be brazed or welded in place. The general structure of each shock absorber is constructed of steel for usual reasons of strength and economy. In this invention certain of these elements are required to be paramagnetic; that is, having a magnetic permeability much greater than one. By the same token it is preferable that at least the plug portion of lower plug 4 not be of steel, but of bronze, duraluminum, etc., so that adjacent elements which are to function magnetically will do so efficiently. Alternately, outer cylinder 1 may be made about 7% longer than shown so that plug 4 is farther removed from the adjacent inner elements.

An inner cylinder 6 is hermetically attached to the lower part of plug 2, as by brazing. Inner cylinder 6 has an integral bottom 7, which may be formed by deep drawing, or by brazing or welding a disk 7 to the cylindrical tube 6.

Piston 8 is attached to the lower end of rod 3, as by fluid-tight (pipe) threads 9 upon the rod and concentrically in the piston. Piston ring 10 is located in a central circumferential slot in piston 8. The ring bears upon the inner surface of inner cylinder 6 to provide an essentially fluid-tight seal. In a similar manner a pair of circumferential slots 11 within the central hole in top plug 2 surround rod 3 and are filled with packing material to provide a fluid-tight seal.

The shock absorber of FIG. 1 is the concentric tube type. In this type the working fluid, such as shock absorber oil, passes from the lower side of the piston through apertures in the inner cylinder, such as 12 near the bottom thereof, thence between the two cylinders 1 and 6, through further apertures 14 at the top of the inner cylinder, and thence to the volume above piston 8.

In order to minimize the "dive" and/or "sway" according to this invention it is necessary to greatly impede the downward motion of piston 8 at the times when the necessary control of the vehicle tends to create such motion. At least one aperture 12 is required which can be substantially controlled electro-magnetically as to area. In the exemplary showing of FIG. 1 three apertures 12 are shown, the fourth being cut away in taking the sectional view. These are shown in the preferred form of round holes, for rapid application of the stabilizing effect upon electrical energization of the shock absorbers. However, these may be slots on an angle to provide a gradual degree of metering as the paramagnetic sleeve 15 assembly is attracted upwardly. As shown the sleeve closes the apertures half way. This is an intermediate position between a lower extreme brought about by compressionresisting spring 16. This spring is positioned between the bottom 7 of the inner cylinder and the paramagnetic bottom disk 17 of the sleeve assembly. The upper extreme position of sleeve 15 is such that apertures 12 are completely closed. This motion is brought about against the force of spring 16 by the magnetomotive force exerted between disks 7 and 17 when solenoid 18 is energized with electric current. This solenoid is wound upon the outer surface of inner cylinder 6, extending at least over half of the length of the cylinder. In an alternate magnetic configuration, sleeve assembly 15, 17 may be all of paramagnetic material and lower disk 7 and the lower part of cylinder 6 may be of non-magnetic material. This allows magnetic attraction between the part of cylinder 6 above apertures 12 and the circumferential sleeve 15 acting to raise the position of the sleeve upward when coil 18 is energized.

A central column 23 is suitably attached to the exterior of lower disk 7. This column serves the dual purpose of holding the inner cylinder 6 centrally with respect to outer cylinder 1. The column fits into the shaped recess in lower plug 4. In the other aspect of its duality the column acts as a second guide for sleeve 15 because of a slide-fit hole in bottom disk 17.

An external electrical connection to coil 18 is provided by fluid-tight bushing 19, through which one end of the wire of the coil extends. The other end of the coil is soldered, crimped or otherwise electrically connected to inner cylinder 6. This cylinder is, in turn, structurally and electrically connected to top plug 2 and therethrough to outer cylinder 1. This provides a return connection through the metallic chassis of the vehicle, including rod 3, etc.

It will be understood that a considerable range of electro-magnetic values may be utilized to successfully carry out this invention. A mechanical force of a number of pounds is required to move and retain sleeve 15 upward against spring 16 and to insure that the hydraulic force exerted by the fluid within inner cylinder 6 below piston 8 tending to pass through blocked-off apertures 12 when the "dive" or "sway" occurs will not force sleeve 15 downward. With the usual 12 volt vehicle storage battery as the source of electricity solenoid 18 may have of the order of 1,000 turns of wire, of size #20 AWG or of somewhat smaller diameter. The coil may have two layers as has been illustrated, or a greater number of layers and perhaps a shorter length as long as the return path for the working fluid between the inner and outer cylinder is not blocked. Since shock absorber fluid is a satisfactory electrical insulator, the solenoid need only be adequately fastened to the inner cylinder 6 to form a satisfactory mechanical structure. This may be accomplished by an epoxy cement or the equivalent. However, encapsulation of the windings in an epoxy or equivalent composition is suggested for usual manufacturing, to lend reliability over an extended life of the shock absorber, which life might include dismantlement for repair.

The resistance of the solenoid should be of the order of only a few ohms so that the current through the same will be in the range of from 2 to 5 amperes. Since current flows in a shock absorber from a few seconds to a small fraction of a minute at any time, the matter of heating due to electrical dissipation can be ignored, as may the drain on the storage battery of the vehicle.

As previously stated, sleeve 15 acts as an "on" "off" valve to minimize "dive" and/or "sway." However, in usual shock absorber practice it is desirable but not imperative, that additional means be provided to give slow recovery to the shock absorber under all circumstances of operation. This takes the form of a second sleeve valve 20 located at the top of the device, surrounding inner cylinder 6, and coactive with apertures 14 therein. Sleeve 20 may be formed of a non-magnetic material, or otherwise removed from any influence of the magnetic field originated by solenoid 18, so that it functions by means of mechanical forces alone. Such functioning is accomplished by providing one or more ducts 21 in top plug 2, which ducts lead from the inside of inner cylinder 6 above piston 8 to the annular space between the inner and outer cylinders at the top of this space. Upon the return of piston 8 upwards fluid pressure is built up above sleeve 20, thus to force it down to ring 22. This ring is brazed or otherwise fastened to the inner wall of outer cylinder 1 and is so located that when sleeve 20 is forced downward a considerable portion of the areas of apertures 14 are obscured. The flow of working fluid is thereby impeded and the usually preferred slow recovery of the shock absorber upon return motion is obtained.

FIG. 2 shows the sectional view 2—2 looking downward upon the bottom part of the shock absorber. The circumferential relation between outer cylinder 1, inner cylinder 6, having bottom disk 7 and apertures 12, with sleeve 15 can be seen.

It will be recognized that one embodiment of a shock absorber suited to act according to conventional practice while also embodying the anti-"dive" and/or anti-"sway" features according to this invention has been presented above. Variations of the construction shown may also be employed; such as a more completely sheet metal type of construction, alterations in the relative sizes of the several elements, and substitutional equivalents for certain elements, without departing from the invention.

The electrical diagram of FIG. 3 gives a system for both "dive" and "sway" control of one vehicle.

Two shock absorbers at the front of the vehicle, being the left-front shock absorber 25 and the right-front shock absorber 26, are shown in simplified top view. The outer circle represents outer cylinder 1 and the inner circle represents rod 3. The left-rear shock absorber is identified as 27 and the right-rear one as 28.

Element 30 represents the internal shaft of a steering wheel as it relates to a turn switch. Frictionally surrounding the same is insulating spring 31, which carries rotatable switch contact 32. While this contact is a complete ring for structural reasons only the outwardly extending portion at the top of the switch is active in making required contacts. Consequently, spring 31 may be formed of nylon or equivalent plastic to provide both elasticity and electrical insulation. Alternately, the major portion of contact 32 may be formed of a strong epoxy, etc. and only the outwardly extending portion thereof at the top may be of metal; this being attached to the epoxy ring so as to be out of electrical contact with spring 31, which may then be of metal.

When the steering shaft 30 is turned to the left, contact 32 will be rotated to the left and will complete electrical contact between left stationary contacts 33 and 34. Contact 33 is connected to the ungrounded terminal of the storage battery 35 of the vehicle. This is usually the positive terminal. The other terminal of the battery is connected to ground, thereby to complete the electrical circuits to the several shock absorbers through the chassis of the vehicle in the known manner. The voltage of battery 35 is typically 12 volts.

Switch contact 34 connects to the solenoid-energizing connection of shock absorber 28 by means of conductor 36 and also to the same connection of shock absorber 26 through diode 37. This diode may be any solid-state junction diode employing, for example, silicon or germanium for the semiconductor material, which is suited to carry a few amperes of electric current in intermittent service. The reverse voltage on the diode is the 12 volts of battery 35. Thus, a JEDEC No. 1N1341A commercially available silicon diode is suitable. This type has a 6 ampere current rating with a maximum reverse voltage rating (PRV) of 50 volts.

The anode of diode 37 is connected to conductor 36, which in turn is connected to the positive terminal of battery 35. Thus, current from the battery passes through the diode as though through a metallic connection and so fully energizes shock absorber 26. By this arrangement, upon the operator making a left turn with the vehicle the right pair of shock absorbers 26 and 28 have solenoids energized. This prevents the "sway" that would otherwise occur with conventional chassis suspension equipment.

An insulated stop 40 is part of insulating housing 41, thereby to prevent active contact 32 from progressing too far to the left and going out of contact with stationary contacts 33 and 34 if the turn is a sharp one. Deformation, circumferentially, of spring 31 occurs. This returns to normal upon the turn being completed or made less extreme.

In an analogous manner, when a right turn is made, contacts 42 and 43 are electrically connected by rotatable contact 32, shock absorber 27 is energized through conductor 44, and shock absorber 25 is energized additionally through diode 38. The anode of the diode is connected to conductor 44 and the cathode thereof to the shock absorber solenoid. Thus, the left pair of shock absorbers is energized to prevent "sway" upon a turn to the right of the vehicle.

When a vehicle stop is executed pressure actuated switch 48 is closed. This switch is hydraulically connected to master brake cylinder 49, or to an equivalent vehicle control element associated with the braking system. Switch 48 may be the same one as is invariably provided for actuating the stop light upon present day motor vehicles. One contact thereof is connected to battery 35 by conductor 50. The other contact connects to conductor 51, which also connects to front shock absorber 26 through diode 45. By means of conductor 52 connection from conductor 51 is also made to shock absorber 25 through diode 46. In both cases the anodes of the diodes connect to the conductors and the cathodes to the coils 18 of the respective shock absorbers.

When the switch 48 is closed it is seen that both diodes 45 and 46 conduct and so energize front shock absorbers 25 and 26. This prevents the "dive" of the vehicle. At the same time diodes 37 and 38 are back-biased. Approximately +12 volts potential is applied to the cathodes of each, thus they act as open circuits to electrical energy provided through stop switch 48. In this way the rear shock absorbers 27 and 28 are *not* energized.

Similarly, upon the left pair of shock absorbers 25 and 27 being energized, diode 46 is back-biased and so right-front shock absorber 26 is *not* energized. Further, upon the right pair of shock absorbers 26 and 28 being energized, diode 45 is back-biased and so left-front shock absorber 25 is *not* energized. By employing the four diodes the four shock absorbers can be selectively energized as required to minimize "dive" and left or right "sway."

It will be noted that the four diode 37, 38, 45 and 46 are all connected in the same polarity to the front shock absorbers; i.e., with the cathodes connected to the solenoids of the shock absorbers when battery 35 has its negative terminal grounded.

It will be recognized that where only anti-"dive" actuation is desired all of the diodes are omitted and conductors 51 and 52 connect directly to shock absorbers 26 and 25, respectively. For such a system the rear shock absorbers 27 and 28 need not be of my special electrical type. Similarly, where only anti-"sway" actuation is desired all of the diodes are omitted, conductor 44 is connected to both left shock absorbers 25 and 27, and conductor 36 is connected to both right shock absorbers 26 and 28.

Other variations of construction and connection may also be employed. For example, the "turn signal" switch regularly supplied on motor vehicles may be employed in the place of switch 32.

Should only a three-wheeled vehicle be employed, one shock absorber is associated with the single wheel, whether this be front or back, and the circuit connections are made as in FIG. 3, with, however, only one shock absorber being employed in the front or the back, as the case may be.

Following the braking system employed on one present-day automobile, the first electrical circuit means, as stop switch 48, may be mechanically actuated, rather than by hydraulic pressure, as is usual.

In order to enhance the mechanical structure of the shock absorber, inwardly directed dimples may be pressed into outer cylinder 1 to bear upon inner cylinder 6 near the bottom thereof. These must, of course, mechanically avoid coil 18 and sleeve 15. Three dimples, essentially equally circumferentially spaced, are suitable.

The working substance, shock absorber fluid, fills all of the volume within the shock absorber, but this liquid has not been shown in the figures for sake of clarity.

It will be further understood that various changes may be made in the size, proportions, and shape of the shock absorber device of this invention, as well as the constructional details thereof, and details of the electrical circuit without departing from the scope of the invention.

Having thus fully described this invention and the manner in which it is to be practiced, I claim:

1. A shock absorber system for a vehicle having front and rear wheels comprising;
    (a) one shock absorber, having an inner cylinder with plural apertures, operatively attached to the structure of each said wheel,
    (b) solenoidal electrical control means within each said shock absorber and surrounding said inner cylinder,
    (c) magnetic aperture-adjusting means within each said shock absorber and surrounding said inner cylinder to alter the resistance of said shock absorber to shock, when said electrical control means is electrically energized by constricting said plural apertures,
    (d) a driver-operated control for said vehicle,
    (e) electrical circuit means operatively connected to said driver-operated control and to said shock absorber system to selectively energize said electrical control means of selected said shock absorbers,
        whereby a change in attitude of said vehicle is minimized upon said driver-operated control being actuated.

2. The shock absorber system of claim 1, in which;
    (a) said driver-operated control for said vehicle is a control for applying a braking force to decelerate said vehicle, and
    (b) said electrical circuit means is connected to actuate said electrical control means upon such front wheels as said vehicle has,
        thereby to minimize the tendency of said vehicle to nose-down upon decelerating.

3. The shock absorber system of claim 1, in which;
    (a) said driver-operated control of said vehicle is a steering wheel control for turning said vehicle, and
    (b) said electrical circuit means is connected to actuate said electrical control means on the shock absorbers on the side of said vehicle opposite to the direction of the turn initiated by said steering control,
        thereby to minimize the tendency of said vehicle to sway downwardly upon the side thereof upon which said shock absorbers are actuated.

4. The shock absorber system of claim 1 in which said electrical circuit means is comprised of;
    (a) a pressure-actuated electric switch operatively connected to the hydraulic brake system of said vehicle.

5. The shock absorber system of claim 1 in which said electrical circuit means is comprised of;
    (a) a mechanically actuated electric switch operatively connected to the brake system of said vehicle.

6. A shock absorber system for a vehicle having front and rear wheels comprising;
    (a) one shock absorber operatively attached to the structure of each said wheel, (b) electrical control means within each said shock absorber,
(c) mechanical aperture-adjusting means within each said shock absorber to alter the resistance thereof to shock,
(d) electro-mechanical means operatively related to said electrical control means and to said aperture-adjusting means to alter said resistance to shock when said electrical control means is electrically energized,
(e) a driver-operated control for said vehicle,
(f) electrical circuit means operatively connected to said driver-operated control and to said shock-absorber system to selectively energize said electrical control means of selected said shock absorbers,
    whereby a change in attitude of said vehicle is minimized upon said driver-operated control being actuated,
and in which said system a said one shock absorber further comprises;
(g) an inner cylinder of paramagnetic material having an aperture in the wall thereof,
(h) a piston having a piston rod within said inner cylinder,
(i) a solenoid winding without said inner cylinder,
(j) a paramagnetic sleeve assembly surrounding said inner cylinder adjacent to said aperture to close said aperture upon the flow of electric current in said solenoid,
(k) resilient means connected to said sleeve to position said sleeve away from said aperture in the absence of electric current in said solenoid,
(l) an outer cylinder enclosing the recited elements, and
(m) a liquid working substance within said inner and said outer cylinders which is valved through said aperture to accomplish control of the resistance of said shock absorber to shock.

7. A shock absorber system for a vehicle having front and rear wheels comprising;
(a) one shock absorber operatively attached to the structure of each said wheel,
(b) electrical control means within each said shock absorber,
(c) mechanical aperture-adjusting means within each said shock absorber to alter the resistance thereof to shock,
(d) electro-mechanical means operatively related to said electrical control means and to said aperture-adjusting means to alter said resistance to shock when said electrical control means is electrically energized,
(e) a driver-operated control for said vehicle,
(f) electrical circuit means operatively connected to said driver-operated control and to said shock absorber system to selectively energize said electrical control means of selected said shock absorbers,
    whereby a change in attitude of said vehicle is minimized upon said driver-operated control being actuated,
and in which said system said electrical circuit means is further comprised of;
(g) a common insulated electrical contact operatively connected to the steering control of said vehicle,
(h) a pair of stationary electrical contacts circumferentially related to said common contact to provide a closed electrical circuit upon said steering control being turned to the *right,* and
(i) a connection from said pair of stationary contacts to a source of electricity and to the electrical control means of the said shock absorbers attached to the structure of each said wheel on the *left* side of said vehicle.

8. A shock absorber system for a vehicle having front and rear wheels comprising;
(a) one shock absorber operatively attached to the structure of each said wheel,
(b) electrical control means within each said shock absorber,
(c) mechanical aperture-adjusting means within each said shock absorber to alter the resistance thereof to shock,
(d) electro-mechanical means operatively related to said electrical control means and to said aperture-adjusting means to alter said resistance to shock when said electrical control means is electrically energized,
(e) a driver-operated control for said vehicle,
(f) electrical circuit means operatively connected to said driver-operated control and to said shock absorber system to selectively energize said electrical control means of selected said shock absorbers,
    whereby a change in attitude of said vehicle is minimized upon said driver-operated control being actuated,
and in which said system said electrical circuit means is further comprised of;
(g) a common insulated electrical contact operatively connected to the steering control of said vehicle,
(h) a pair of stationary electrical contacts circumferentially related to said common contact to provide a closed electrical circuit upon said steering control being turned to the *left,* and
(i) a connection from said pair of stationary contacts to a source of electricity and to the electrical control means of the said shock absorbers attached to the structure of each said wheel on the *right* side of said vehicle.

9. A shock absorber system for a vehicle having front and rear wheels comprising;
(a) one shock absorber operatively attached to the structure of each said wheel,
(b) electrical control means within each said shock absorber,
(c) mechanical aperture-adjusting means within each said shock absorber to alter the resistance thereof to shock,
(d) electromechanical means operatively related to said electrical control means and to said aperture-adjusting means to alter said resistance to shock when said electrical control means is electrically energized,
(e) a driver-operated control for said vehicle,
(f) electrical circuit means operatively connected to said driver-operated control and to said shock absorber system to selectively energize said electrical control means of selected said shock absorbers,
    whereby a change in attitude of said vehicle is minimized upon said driver-operated control being actuated,
and in which said system said driver-operated control for said vehicle comprises selectively operable controls for applying a braking force for decelerating said vehicle and a steering control for turning said vehicle, including;
(g) an electrical conductor, including a diode, connecting first electrical circuit means of said control for applying a braking force with each said shock absorber attached to the structure of said front wheels,
(h) an electrical conductor, including a diode, selectively connecting second electrical circuit means upon said steering control being turned to the right with the left-front said shock absorber,
(i) an electrical conductor, including a diode, selectively connecting said second electrical circuit means upon said steering control being turned to the left with the right-front said shock absorber,
(j) an electrical conductor selectively connecting said second circuit means upon said steering control being turned to the right with the left-rear said shock absorber, and
(k) an electrical conductor selectively connecting said second circuit means upon said steering control being turned to the left with the right-rear said shock absorber, whereby
- said shock absorbers attached to the structure of said front wheels are electrically actuated upon said braking force being applied,
- the pair of right said shock absorbers is electrically actuated upon said steering control being turned to the left, and
- the pair of left said shock absorbers is electrically actuated upon said steering control being turned to the right.

10. The shock absorber system of claim 9 in which;
(a) each said diode has a polarity to pass electric current, and,
(b) the connection to each of said front shock absorbers with respect to said polarity is the same.

References Cited by the Examiner

UNITED STATES PATENTS

| | | | |
|---|---|---|---|
| 2,855,075 | 10/1958 | Lowber | 188—87 |
| 3,039,566 | 12/1962 | Rumsey. | |
| 3,068,023 | 12/1962 | Fiala. | |
| 3,264,008 | 8/1966 | Allinquant. | |

BENJAMIN HERSH, *Primary Examiner.*

MILTON BUCHLER, *Examiner.*

P. M. GOODMAN, *Assistant Examiner.*